INVENTOR.
PAUL J. WEAVER
BY
ATTORNEYS.

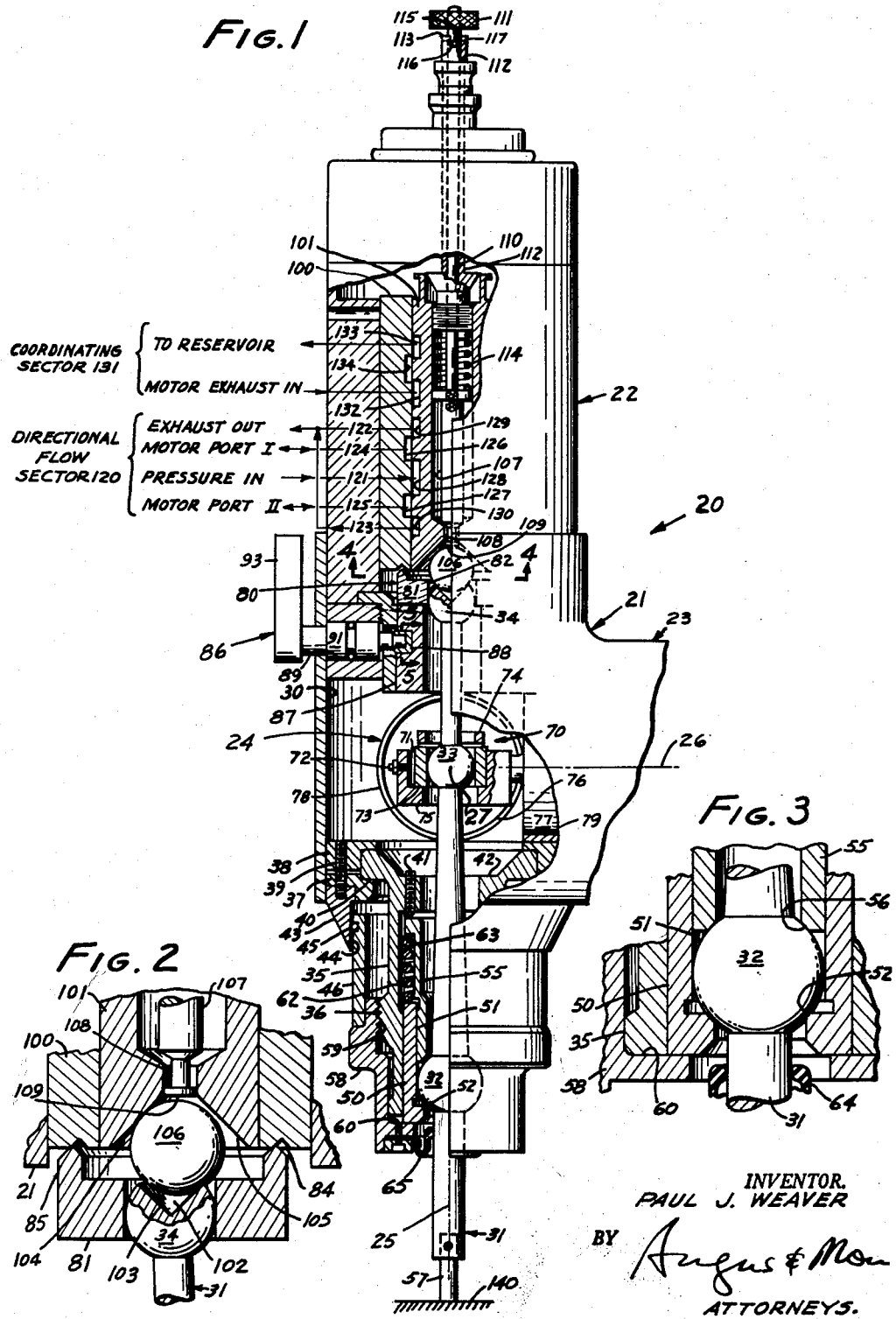

United States Patent Office 3,186,425
Patented June 1, 1965

3,186,425
CONVERTIBLE MODE TRACER VALVE
Paul J. Weaver, Pasadena, Calif., assignor to True-Trace Corporation, El Monte, Calif., a corporation of Connecticut
Filed Mar. 20, 1962, Ser. No. 180,971
14 Claims. (Cl. 137—270)

This invention relates to hydraulic tracer valves for use with contour duplicating machine tools.

It is common to control movements of machine tool elements along a plurality of non-parallel axes by tracing along the contour of a template with the stylus of a tracer valve. Stylus deflections which derive from the contact of the stylus and the template are utilized adjustably to set the conditions of flow-rate and flow-direction in valves, usually of the spool valve type. The spool valves, in turn, are connected to a source of motive fluid under pressure, and to respective motors for shifting the machine tool elements as a consequence of the flow through the valves. The shifting of the elements in valves effect relative motion of a workpiece and a cutting tool, and the contour of the template, is thereby reproduced in the workpiece.

There are a number of basic modes or techniques in which tracer valves are used. One mode involves the use of two perpendicularly oriented spool valves under the control of a stylus to accomplish the cutting of a contour in single plane. This mode, often called "360°" tracing, is shown in United States Patent No. 2,753,145 issued to Rosebrook on July 3, 1956.

Another mode involves the use of three orthogonally oriented spool valves under the control of a stylus to accomplish the cutting of a contour in three dimensions. This mode is often called "3–D" tracing, and is shown in United States Patent No. 2,835,466 issued to Rosebrook on May 20, 1958.

A third mode involves the use of a single two-sector spool valve under the control of a stylus, which valve controls two motors. Each of these motors actuates a machine tool element on a respective machine tool axis normal to the other. Such a mode is illustrated in the presently co-pending patent application of Paul J. Weaver, Serial No. 748,426, filed July 14, 1958, entitled "Pattern Controlled Machine Tool," now Patent No. 3,055,393, which application is assigned to the same assignee as the instant application. Still another single two-sector valve exerting substantially the same mode of control, is shown in United States Patent No. 2,971,535 which issued to Weaver on February 14, 1961. This mode is sometimes called "coordinated tracing."

As can be seen by reference to the aforesaid patents and patent application, tracer valves have been designed for each mode. Each includes means for adjustably limiting the maximum rate of flow through the valves, and each provides a technique wherein a null position of the spools represents a unique adjustment representing some selected equilibrium state.

For example, in 360° tracing a vertical position of the stylus relative to a pair of horizontal spool valves usually represents an equilibrium wherein neither spool valve permits net fluid flow therethrough, and the machine tool elements do not move. Deflection of the tracer from its central position (sometimes called a "neutral" or a "null" position) shifts the spools of the spool valves to cause fluid under pressure to flow to the motors. The machine tool elements will then move, and will attempt to return the stylus and the valves again to their null positions through a resulting change in relative position of the stylus and template. Rate control is exerted by devices which limit how far the stylus can be deflected.

In 3–D tracing, the same provisions as for 360° tracing are included, plus a third valve whose spool is shiftable up and down by the stylus. Rate control on the third spool valve is exerted only on the downward plunge, and is accomplished by restricting how far in that direction the spool can move from its null position. The rate at which the device moves a cutting tool away from the work is unimportant, and it not ordinarily individually limited.

In coordinated tracing, it is common for motion along one axis to occur at a maximum rate when there is no motion at all along the other axis. In such an arrangement, the spool of a spool valve must be free to move through a range which covers a shut-off condition on both axes. This dictates that the spool valve's lower limit of spool travel is largely determined by the geometry of the flow control channels inside the valve. The latter is not adjustable. Therefore, limiting the axial shift of a spool is not an effective rate control in this type of device. One form of rate control which is effective, is shown in the aforesaid Weaver patents and patent application, wherein depressions and hollows in the form of notches are formed in the spool and in the sleeve of the spool valve so that the cross sections of flow channels in the valve are adjustable by rotating the spool within the sleeve.

With the above in mind, it should now be noted that stylus play, and the vertical positioning of the stylus at null valve settings, will vary with the mode of use. For example, in 360° tracing, vertical movement of the stylus is unnecessary and occasionally undesirable. The third valve is not used. For this mode of operation, the pivot point of the stylus is merely established at some selected vertical level.

In 3–D tracing, raising and lowering the bottom rest point of the stylus, raises and lowers the maximum downward position of the spool valve, and this position determines the maximum flow rate for plunger movements. This raising and lowering must be an adjustable matter, or the rate cannot be adjusted.

In coordinated tracing, the maximum downward position of the vertical valve must be at least a given distance below null, and is usually invariable. Often it will be lower than any comparable allowable position for 3–D tracing. This setting is also carried out by adjusting the stylus elevation.

It is evident from the foregoing, that if the same stylus and valve combination is to function for more than one mode, means must be provided to set the valves and stylus to positions appropriate to the respective mode.

It is an object of this invention to provide a tracer valve which can be used in a plurality of tracing modes, and which is readily adjustable to function in selected ones of said modes.

A hydraulic tracer valve according to this invention includes three spool valves disposed on three non-parallel axes. The spool valves and a stylus for regulating their position are mounted in a body.

Stylus means are provided for tiltably mounting and adjustably varying the elevation of the stylus, thereby to define certain positions of the spool valves.

Converter means are provided for adjusting the relative axial position of the stylus and the spool of one of the spool valves, and to determine the mode of operation of this spool valve.

The above and other features of this invention will be fully understood from the following detailed description and the accompanying drawings, of which:

FIG. 1 is a side elevation, partly in cutaway cross-section, showing the presently preferred embodiment of the invention;

FIGS. 2 and 3 are fragmentary elevations, partly in cutaway cross-section, showing portions of FIG. 1 in different positions of adjustment;

Figure 4:
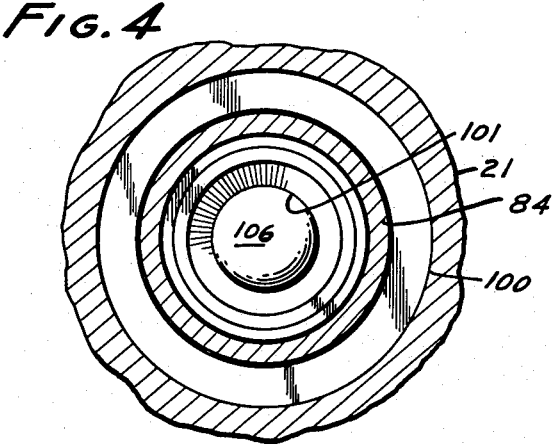
Figure 5:
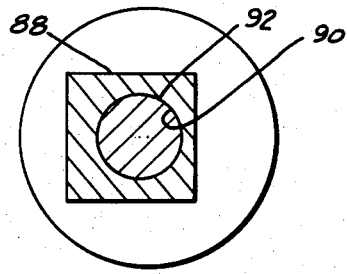
Figure 6:
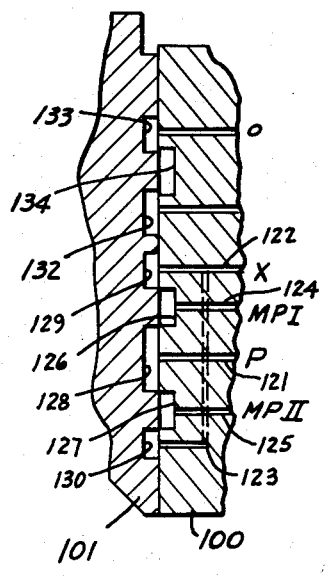
Figure 7:
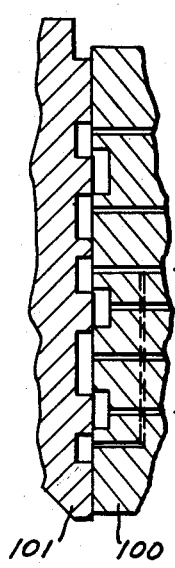
Figure 8:
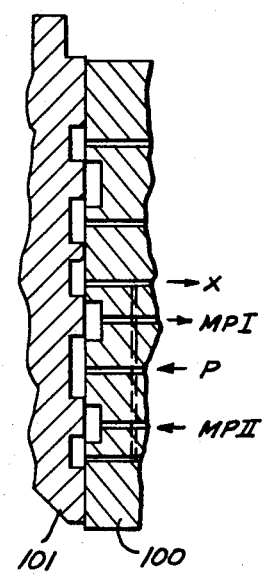

FIGS. 4 and 5 are cross-sections taken at lines 4—4 and 5—5, respectively, in FIG. 1; and FIGS. 6, 7 and 8 are fragmentary cross-sections illustrating settings of valves usable in this invention.

The presently preferred embodiment of a hydraulic tracer valve 20 according to the invention is shown in FIG. 1. It includes a body 21 having mounted thereto three spool valves: a first spool valve 22, a second spool valve 23, and a third spool valve 24. These valves have central axes 25, 26 and 27, respectively. Axis 27 is normal to axes 25 and 26 and to the plane of FIG. 1.

Spool valves 23 and 24 are shown only schematically. Full details of their construction will be found in the aforesaid Rosebrook Patent No. 2,753,145.

Axes 25–27 are orthogonally related to each other, axis 27 being normal to the plane of FIG. 1. In normal operation, first axis 25 will be upright and axes 26 and 27 will lie in a horizontal plane.

The body includes a stylus passage 30 which passes a stylus 31. The stylus includes first, second and third ball-like members 32, 33, 34, which are integral with the stylus and spaced apart along the first axis.

The body includes an insert 35 having an exterior thread 36 thereon. The insert is held against a base plate 37 by a clamp ring 38 which is drawn toward the base plate by screws 39 to clamp a flange 40 between them. An adjustment screw 41 extends axially relative to the first axis, and is threaded through an internal flange 42 on the insert.

A first shroud ring 43 is held to the insert, and projects downwardly to form a contact surface 44 for an O-ring 45 carried in a groove in a second shroud ring 46. The two shroud rings provide a dust seal for the lower portion of the tracer valve.

Stylus mounting means is provided for tiltably mounting and adjustably varying the elevation of the stylus and to limit the extent of its axial movement. These means include a first retainer 50, which includes an internal wall 51 that embraces the first ball-like member and renders it laterally immovable. The retainer is disposed in the stylus passage. A first ball seat 52 for the first ball-like member is disposed on first retainer 50. The first ball seat surrounds the stylus on the opposite side of the first ball-like member from the first spool valve. The first ball seat is adapted to support the first ball-like member, and to define its lowermost position.

Retainer adjustment means is provided for adjusting the location of the first ball seat along the first axis. This means includes a second retainer 55 disposed in the stylus passage which bears a second ball seat 56. The second ball seat is on the opposite side of the first ball-like member from the first ball seat, the second ball seat being adapted to limit the upward movement of the first ball-like member.

The stylus has a tip 57 which extends beyond the body, and which is adapted to tilt universally in all directions from the illustrated null position, and which is also axially shiftable by a distance equal to the axial spacing between the first and second ball seats.

The retainer adjustment means further includes an internally threaded member 58 having an internal thread 59 threaded onto thread 36 of the insert. Threaded member 58 has a shoulder 60 which underlies the first retainer so as to support the same from beneath. A coil spring 62 is opposed between the first retainer and shoulder 63 on the second retainer and forces the first retainer toward and against shoulder 60 and the second retainer toward and against adjustment screw 41.

A dust seal boot 64 is clamped to the bottom of the threaded member and makes a flexible-collar contact with the stylus. It has a flexible loop 65 enabling the stylus to go through its motions without restriction from the boot.

A yoke 70 embraces second ball-like member 33. This yoke is identical to that shown on the aforesaid Rosebrook Patent No. 2,753,145, with the exception that a gib 71 is interposed between an adjustment screw 72 and the wall of a block 73. U-shaped members 74, 75 are respectively attached to spools 76, 77 of spool valves 23 and 24. It will be seen, that these spools are axially slidable within respective sleeves 78, 79. The details of the yoke are unimportant to this invention, and will be found in Rosebrook Patent No. 2,753,145.

It will now be appreciated that adjustment of second and third spool valves 23 and 24 along their respective axes, occurs as a function of tilting movement of the stylus, with components of motion transmitted to the spools through yoke 70. Limitation on the extent of the tilting movement limits the valve adjustment, and constitutes a rate control for spool valves 23 and 24, when they are used in 360° and 3-D tracing operations. For this purpose there is provided rate control means 80. This rate control means comprises a ring 81 having a central opening 82, the wall of which embraces the third ball-like member so that there is no lateral play between them. Thus, ring 81 moves laterally relative to the first axis when the stylus pivots around the first ball-like member. Central opening 82 has a substantial axial extent so that contact between the third ball-like member and the wall of opening 82 occurs despite changes in elevation of the stylus.

Sleeve 100 of spool valve 22 is rigidly mounted in body 21, and has a groove 84 which is defined by matching tapered surfaces, in this case, two conical surfaces converging toward each other at the base of the groove. The ring includes a shoulder 85, whose end facing the groove is defined by substantially matching tapered surfaces. It will be noted, that where the ring to be moved upwardly so that shoulder 85 is firmly seated in groove 84, the stylus could not be tilted at all. On the other hand, if the ring is moved down in FIG. 1, the extent of lateral motion permitted to the ring increases as the shoulder moves axially away from the groove. This is the operation of the rate control technique for the second and third spool valves.

Mounting means 86 is provided for axially moving ring 81 to make this adjustment. The mounting means includes a ring support 87 disposed beneath and supporting the ring. In an outer wall on the ring support there is an opening in which a block 88 is fitted. This block is illustrated in FIG. 5 and is shown rectangular, having a journal 89 therein which is disposed off the center of the block. The opening 90 in the outer wall of the ring support is either square or may be formed as a flat-sided groove. This enables there to be an initial elevation adjustment by rotating the block to one of four selected positions before inserting it into the opening.

An eccentric comprising a shaft 91 and an eccentric pin 92 off the center of the shaft, projects through the wall of the body. The eccentric pin is fitted in journal 89. A handle 93 is provided outside the body for rotating shaft 91, and thereby moving the ring support up and down to adjustably space apart groove 84 and shoulder 85.

First spool valve 22 includes a sleeve 100 and spool 101. Such a spool will be found described in detail in the aforesaid Weaver patents and patent application, and the grooves and their connections to machine tools will be described only briefly herein, and this will be done later in this specification. Suffice it to say at this point, that the spool is both rotatably and axially slidably disposed within the sleeve. Both the spool and sleeve have cylindrical lands adapted to make surface to surface fluid sealing contact so that flow occurs between the various grooves only when edges of respective grooves overlap to create an orifice between them.

Up and down movement of spool 101 can be caused by several elements. As can be seen from FIG. 1, a third ball-like member 34 includes an axially-oriented depression 102 in its end which is formed by non-planar surface of revolution 103, which in this case is a cone having a 90° included conical angle on the axis. Depression 102 faces toward the spool of the first spool valve.

The end of the first spool valve facing toward the stylus has an axially-oriented depression formed by a concave surface of revolution 105 which also is a cone having a 90° included angle. A ball 106 rests on the end of the spool and normally fits centrally within depression 102. Spool 101 is supported by the stylus through this ball.

Converter means is provided for adjusting the minimum spacing between spool 101 and the center of ball 106. The converter means includes a pin 107 which passes through a converter passage 108 in the spool, and includes a planar surface 109 on its end adjacent to the ball. The converter pin is mounted to a threaded stud 110, the stud extending through the body and terminating in a knurled nut 111. The stud is cylindrical and passes through a cylindrical passage in the body so as to be both rotatable and slideable therein.

A spool extension 112 passes through the body and terminates in a shoulder 113. It will be understood that stud 110, knurled nut 111, and shoulder 113 move up and down with the spool, and are freely fitted in the body for this slidable movement. Also, a structure connected to shoulder 113 can be rotated to turn the spool inside the sleeve so as to provide for rate control adjustments when a spool with notches on the lands defining grooves on the spool and sleeve is used. The notches are not illustrated in the drawings, because they are not essential to the invention. They are fully illustrated and described in the aforesaid Weaver patents and patent application. They merely comprise one form of rate control for the spool valve illustrated herein. Neither the notches nor a rotatable spool would be needed should external flow control devices such as metering valves be used for controlling the rate.

Means is provided for shifting the planar surface 109 relative to the spool. This comprises a compression spring 114 in opposition between pin 107 and the spool, forcing them apart and thereby forcing the pin toward a first axial position, illustrated in FIG. 1. This position is defined by the interaction between a cross-member 115, comprising a pin passed through the stud and extending beyond it, and a pair of detents 116, 117 formed in shoulder 113. Detent 116, in which the cross-member is shown fitting in FIG. 1, enables the planar surface 109 to be moved into engagement with ball 106, the position illustrated in FIG. 1.

If, however, the knurled nut is pulled upward while spool extension 112 is held down, the stud is rotated 90° so that the cross-member enters the detent 117, then the planar surface will be moved to the second position illustrated in FIG. 2.

The important difference is in the position of planar surface 109 in FIGS. 1 and 2, and is of importance to the operation of the first spool valve. It will be observed in FIG. 1 that the planar surface is out far enough that substantial central areas of depression 104 cannot be contacted by the ball. The ball can never make a tangential contact around its entire periphery. Therefore, tilting movement of the stylus will not cause appreciable vertical movement of the spool. This is because the stylus moves from the vertical axis 25 by only a very few degrees, and the vertical component of such a small-angle movement is too small to be of appreciable effect. Therefore, with the planar surface in its first position as illustrated in FIG. 1, spool 101 will move vertically only as a consequence of vertical movement of the stylus.

On the other hand, in the position shown in FIG. 2, the planar surface has been withdrawn so that the ball can become tangent to depression 102 around its periphery, and is not deprived of contact with substantial central sections of the depression. In this arrangement, the spool will be elevated either by up and down movement, or by tilting movement, of the stylus. As can be seen in FIG. 2, tilting movement causes the ball to roll along the surfaces of both of the depressions thereby raising the spool relative to the sleeve. This difference in the position of the planar surface relative to the spool converts the spool valve from one mode of operation to another as shortly will be seen.

The fluid connections to first spool valve 22 will briefly be described. There is a directional flow sector 120 which includes the following fluid connections to the spool valve passage: pressure port 121; exhaust ports 122, 123; and motor ports I and II, 124, 125. This directional flow sector is a four-way valve which routes pressure selectively to one or the other of motor port I or motor port II, and connects the other motor port to exhaust when this sector is shifted in either direction from its illustrated null position. The sleeve includes motor grooves 126, 127. The spool includes a pressure groove 128 and two exhaust grooves 129, 130.

First spool valve 22 also has a coordinating sector 131, which includes an inlet groove 132, customarily connected to the exhaust of a motor whose rate of operation is being controlled, an exhaust groove 133 connected to reservoir, and a by-pass groove 134 in the sleeve. In the null position, the by-pass groove overlaps both of grooves 132 and 133. As will later be evident, shifting the spool far enough in either direction causes an underlap condition one way or the other to shut off flow between grooves 32 and 133. Short of the underlap condition, there is a metering action because of the adjustably variable overlap.

FIGS. 6, 7 and 8 illustrate three conditions of sleeves 100 and 101. In FIG. 6 the same condition as that illustrated in FIG. 1 is shown, where the spool and sleeve are in their relative null position, wherein there is no net flow from pressure port 121 to either of the motor ports, so that a motor connected to this sector will not move in either direction. As to the coordinating sector, there is the maximum clearance at both edges of the by-pass groove and maximum flow can occur between grooves 132 and 133.

FIG. 7 shows spool 101 lowered relative to the sleeve. In this case, in the directional flow sector pressure may flow from pressure port 121, out motor port II, to a motor, while receiving exhaust fluid from motor port I, and out exhaust port 122.

In the coordinating section it will be noted that the lower edge of the by-pass groove is aligned or underlapped with the inlet groove and that no flow can come from the exhaust of the other motor, therefore, the motor under the control of the directional flow sector is operating at some selected rate of speed and direction, while the other motor is held still. Note that this is a reversal of the motor-operating conditions from those which are determined by the valve settings of FIGS. 1 and 6.

In FIG. 8 the spool is moved up by the same amount as it was moved down in FIG. 7, and it will be noted that in this case, pressure fluid is passing from port 121 out motor port I, and that exhaust fluid is returned through motor port II and out exhaust port 123. The motor under control of the directional flow sector as illustrated in FIG. 8, moves in the opposite direction from that condition illustrated in FIG. 7. The other edge of the coordinating sector is in an aligned or underlapped condition, shutting off the motor under the control of the coordinating sector.

It can readily be seen from the above and also from the aforesaid Weaver patents and patent application, that at spool positions intermediate between those of FIGS. 7 and 8, a metering action will occur in the coordinating section, and also there will be a lesser rate of flow from the pressure port to the selected one of the motor ports receiving fluid under presure. The foregoing explains both the coordinated control of two axes by this two-sector valve.

The directional flow sector in valve 22 constitutes an illustration of the entire operative portion of spool valves 23 and 24, which have identical grooves and port connections. These valves are not provided with coordinating sectors.

It will further be understood that with respect to operation of the valve while operating as a coordinated tracer, it is necessary for the spool to shift at least as far down as the position of FIG. 7, and therefore, the stylus must be supported at least far enough down to let the spool assume the position shown. It will also be understood that the rate control for the directional flow sector is determined by how far the spool is permitted to drop relative to the sleeve, and that by supporting the spool so that it can drop only by some adjusted distance, the maximum size of the flow orifices through the sector are thereby determined and the rate is set.

The operation of the device may now be understood by initially considering FIG. 1 in which the device is shown with the tracer tip in contact with a template 140, the valves being shown in a null equilibrium condition throughout. It is illustrated in the 3–D mode of tracing. As can be seen, the first retainer has been lowered so that there is room for axial movement of the stylus. It has been adjusted by turning threaded member 58 to set the first ball seat at that level which, when the stylus is down with the first ball-like member resting on it, the maximum desired shifting of the spool in the sleeve of valve 22 is effected. Tilting movement of the stylus will operate the second and third spool valves in accordance with known and above-discussed operation. Reference may be had to Rosebrook Patent No. 2,753,154 for further details of construction and operation of valves 23 and 24.

As to valve 22, ball 106 simply moves back and forth across planar surface 109 when the stylus tilts, the small angle through which the stylus moves not having a sufficient vertical component appreciably to effect the setting of spool 101. When the stylus moves vertically it presses against the planar surface, and through the compression spring 114 moves the spool up and down. Flow connections to the coordinating sector are not used in the 3–D mode. They may simply be left open so as not to impede shifting of the spool.

To convert the device to the coordinated tracing mode, pin 107 is rotated until the cross-member seats in detent 117 thereby retracting the planar surfaces to the position shown in FIG. 2. This will drop the spool 101 relative to the stylus because the elevation of pin 115 relative to the valve body will be raised, and the spool will then move down to seat upon ball 106, instead of being supported by ball 106 through surface 109. Threaded member 58 will then be turned to move the ball seats so that the spool 101 is in the position illustrated by FIG. 7. Flow connections to spool valves 23 and 24 are not used in the coordinated mode. Their connections may be left open so that their spools "float" without impeding movement of the stylus.

In the coordinated mode of operation as illustrated in FIG. 2, the threaded member is turned until the desired maximum movement of the spool downwardly is accounted for. Axial tilting of the stylus is transmitted into vertical movement of FIG. 2 by reaction between the surfaces forming the two depressions and the ball. Movement of the spool 101, both by tilting and axial movement of the stylus, is necessary in the coordinated tracing mode while it is not desired in the 3–D mode.

To convert the device to the 360° mode of tracing, threaded member 58 is turned to move the first ball seat up to trap the first ball-like member between the first and second ball seats as shown in FIG. 3. Flow connections to spool valve 22 are not used in 360° tracing. They may simply be left open so that the spool can "float."

In the 360° mode of tracing, the first ball-like member is "trapped," but not to the degree that it is clamped. It must still be free to rotate around horizontal axes. However, it has only negligible freedom to move vertically. This trapping of the ball avoids gouging of the work which could occur were there vertical freedom, when a three dimensional pattern is being copied by making successive passes around the pattern at successive, different, elevations. Were there to be freedom for vertical movement, and the operator accidentally lifted the stylus, then the stylus could contact the pattern at a different elevation, and, when contact is resumed at the old elevation, it is almost likely that a gouging motion would take place. The illustrated construction avoids this rise.

It is evident that markings may be placed between the body and the rotatable threaded member to indicate the settings of the first ball-like member as a function of the rotational position of threaded member 58.

It will thus be seen that this device provides a tracer valve which can be utilized for the three aforesaid modes of tracing. It can also be used for a simple 180° tracing mode simply by not using the synchronizing flow sector, and also spool valves 23 and 24, the connections being left open as aforesaid.

The device is elegantly simple, and conversion from one mode to another is made simply by adjusting the rotational position of pin 107 relative to the detents, by adjusting the setting of threaded member 58, and by disconnecting or otherwise opening unnecessary fluid connections.

This invention is not to be limited by the embodiment shown in the drawings and described in the description which is given by way of illustration and not of limitation, but only in accordance with the scope of the appended claims.

I claim:

1. A hydraulic tracer valve comprising: three spool valves, each spool valve having an axis, the axes being normal to each other, each spool valve comprising a sleeve and a spool inside the sleeve, which are axially slidable relative to each other in order to provide hydraulic connections for metering and passing fluid under pressure for controlling and powering the movement of machine tool elements, a first of the spool valves having its axis substantially upright; a body mounting the three spool valves, and having an internal stylus passage; an elongated stylus having an axis, the stylus being disposed in the stylus passage and generally aligned with the axis of the first spool valve; three ball-like members integral with the stylus; stylus mounting means mounted to the body for tiltably mounting and adjustably varying the elevation of the stylus and to limit the extent of its axial movement, comprising a first retainer having an internal wall forming a central passage, the internal wall embracing the first ball-like member and rendering it laterally immovable, the retainer being disposed in the stylus passage, a first ball seat for the first ball-like member disposed on said retainer and surrounding the stylus on the opposite side of the first ball-like member from the first spool valve, said first ball seat being adapted to support the first ball-like member, retainer adjustment means for adjusting the location of said first ball seat along the first spool axis, a second retainer having a central axis and disposed in said stylus passage, a second ball seat on the second retainer and surrounding the stylus on the opposite side of the first ball-like member from the first ball seat, the second ball seat being adapted to limit the vertical movement of the first ball-like member, whereby said stylus is universally tiltably mounted to the body with a tip portion projecting beyond the body to make contact with a contour to be traced and duplicated; a yoke connected to the second and third of said spool valves and embracing the second ball-like member, whereby tilting movement of the stylus is converted into axial movements of the second and third spool valves; rate control means comprising a ring embracing the third ball-like member, means immovably connected to the body forming a groove, a shoulder on said ring adapted to enter into the groove, matching tapered surfaces on the groove and shoulder; means mounting the ring for axial movement toward and away from the groove so as adjustably to vary the amount of lateral movement permitted to the ring and thereby to the second and third ball-like members; a converter passage in the first spool, an axial concave surface of revolution forming a depression in the end of the stylus facing the first spool; an axial concave surface of revolution forming a depression in the end of the first spool facing the stylus; a ball lying in the stylus depression adapted to support the first spool; converter means in said converter passage comprising a pin having a planar surface lying normal to the first spool axis, and means for shifting the planar surface into a first axial postion to make contact with the ball to prevent it from contacting central regions of the spool depression and to shift the planar surface into a second axial position where it permits unimpeded contact between the ball and the spool depression.

2. A hydraulic tracer valve according to claim 1 in which the retainer adjustment means comprises threaded means threadedly attached to the body and adapted to move the first retainer axially along the first spool axis.

3. A hydraulic tracer valve according to claim 1 in which the retainer adjustment means comprises a threaded member threadedly attached to the body, a shoulder on the threaded member adapted to engage the first retainer, and a spring compressed between the first and second retainers pressing the first retainer against the shoulder, and the second retainer against the body.

4. A hydraulic tracer valve according to claim 3 in which the body includes an adjustment screw which projects toward, and is adapted to engage the second retainer for adjustably limiting the axial movement of the second retainer toward the first spool valve.

5. A tracer valve according to claim 1 in which the means mounting the ring comprises a ring support surrounding the stylus and disposed beneath and supporting the ring, an outer wall on said support having an opening therein, and an eccentric rotatably mounted in the body and fitting into the opening, whereby turning the eccentric changes the axial position of the ring along the first spool axis.

6. A hydraulic tracer valve according to claim 5 in which the eccentric comprises a shaft journaled in the body, an eccentric pin off the axis of the shaft, a rectangular block in the opening, and a journal off-center of the rectangular block receiving the eccentric pin.

7. A hydraulic tracer valve according to claim 1 in which the pin includes a cross-member, and in which the first spool includes a pair of detents each at a different location along the first spool axis, the pin being rotatable relative to the first spool, and spring means between the pin and the first spool biasing the cross-member toward the detents and the planar surface toward the ball, whereby the planar surface is disposed in one or the other of said axial positions depending on which of the detents the cross-member engages.

8. A hydraulic tracer valve according to claim 1 in which the retainer adjustment means comprises a threaded member threadedly attached to the body, a shoulder on the threaded member adapted to engage the first retainer, and a spring compressed between the first and second retainers pressing the first retainer against the shoulder and the second retainer against the body, and in which the means mounting the ring comprises a ring support surrounding the stylus and disposed beneath and supporting the ring, an outer wall on said support having an opening, and an eccentric rotatably mounted in the body and fitting into the opening, whereby turning the eccentric changes the axial position of the ring along the first spool axis, and in which the pin includes a cross-member, and in which the first spool includes a pair of detents each at a different location along the first spool axis, the pin being rotatable relative to the first spool, and spring means between the pin and the first spool biasing the cross-member toward the detents and the planar surface toward the ball, whereby the planar surface is disposed in one or the other of said axial positions depending on which of the detents the cross-member engages.

9. A hydraulic tracer valve according to claim 8 in which the body includes an adjustment screw projecting toward and adapted to engage the second retainer for adjustably limiting the axial movement of the second retainer toward the first spool valve, and in which the eccentric comprises a shaft journaled in the body, an eccentric pin off the axis of the shaft, a rectangular block in the opening, and a journal off-center in the rectangular block receiving the eccentric pin.

10. In a hydraulic tracer valve of the class having a body, a substantially upright spool valve mounted to the body, which spool valve includes a relatively shiftable spool and sleeve, the relative positions of which are determined by the position of a stylus, the stylus including a ball-like member, stylus mounting means mounted to the body for tiltably and adjustably varying the elevation of the sylus and to limit the extent of the axial movement of the stylus along an axis aligned with the spool valve comprising a first retainer having an internal wall forming a central passage extending continuously along said axis, the internal wall embracing the ball-like member and rendering it laterally immovable, the retainer being disposed inside the body, a first ball seat for the ball-like member disposed on said retainer and surrounding the stylus on the opposite side of the ball-like member from the said spool valve, said first ball seat being adapted to support the ball-like member, retainer adjustment means for adjusting the location of the first ball seat along the said axis, a second retainer, a second ball seat on the second retainer surrounding the stylus on the opposite side of the ball-like member from the first ball seat, the second ball seat being adapted to limit the vertical movement of the ball-like member, whereby said stylus is rendered universally tiltably mounted on the body with a tip portion projecting beyond the body to make contact with a contour to be traced and duplicated.

11. A tracer valve according to claim 10 in which the retainer adjustment means comprises a threaded member threadedly attached to the body, a shoulder on the threaded member adapted to engage the first retainer, and a spring compressed between the first and second retainer pressing the first retainer against the shoulder, and the second retainer against the body.

12. A hydraulic tracer valve according to claim 11 in which the body includes an adjustment screw projecting toward and adapted to engage the second retainer for adjustably limiting the axial movement of the second retainer toward the spool valve.

13. A hydraulic tracer valve according to claim 11 in which the spool includes an axial converter passage, an axial concave surface of revolution forming a depression on the end of the stylus facing the spool, an axial concave surface of revolution forming a depression in the end of the spool facing the stylus; a ball lying in the stylus depression adapted to support the spool; converter means in said converter passage comprising a pin having a planar surface lying normal to the spool axis, and means for shifting the planar surface into a first axial position to make contact with the ball to prevent it from contacting central regions of the spool depression and to shift the planar surface into a second axial position where it permits unimpeded contact between the ball and the spool depression.

14. A hydraulic tracer valve according to claim 13 in which the pin includes a cross-member, and in which the spool includes a pair of detents each at a different location along the axis, the pin being rotatable relative to the spool, and spring means between the pin and the spool biasing the cross-member toward the detents and the planar surface toward the ball, whereby the planar surface is disposed in one or the other of said axial positions depending on which of the detents the cross-member engages.

References Cited by the Examiner

UNITED STATES PATENTS

| | | | |
|---|---|---|---|
| 2,618,244 | 11/52 | Roehm | 251—3 X |
| 2,753,145 | 7/56 | Rosebrook | 251—3 |
| 2,835,466 | 5/58 | Rosebrook | 251—3 |
| 2,971,535 | 2/61 | Weaver | 251—3 X |
| 2,994,502 | 8/61 | Ruzick | 251—3 |
| 3,055,393 | 9/62 | Weaver | 137—622 |

ISADOR WEIL, *Primary Examiner.*